US012250764B2

(12) United States Patent
Moss et al.

(10) Patent No.: US 12,250,764 B2
(45) Date of Patent: *Mar. 11, 2025

(54) DC PLASMA TORCH ELECTRICAL POWER DESIGN METHOD AND APPARATUS

(71) Applicant: Monolith Materials, Inc., Lincoln, NE (US)

(72) Inventors: John Jared Moss, Palo Alto, CA (US); Brian T. Noel, Oakland, CA (US)

(73) Assignee: Monolith Materials, Inc., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,918

(22) Filed: Apr. 21, 2023

(65) Prior Publication Data

US 2023/0354501 A1 Nov. 2, 2023

Related U.S. Application Data

(63) Continuation of application No. 16/892,199, filed on Jun. 3, 2020, now Pat. No. 11,665,808, which is a continuation of application No. 15/221,088, filed on Jul. 27, 2016, now abandoned.

(60) Provisional application No. 62/198,431, filed on Jul. 29, 2015.

(51) Int. Cl.

| | |
|---|---|
| ***H05H 1/26*** | (2006.01) |
| ***H05H 1/34*** | (2006.01) |
| ***H05H 1/36*** | (2006.01) |
| *H05H 1/24* | (2006.01) |

(52) U.S. Cl.

CPC ............ *H05H 1/36* (2013.01); *H05H 1/3431* (2021.05); *H05H 1/2443* (2021.05)

(58) Field of Classification Search

CPC .. H05H 1/26; H05H 1/36; H05H 1/48; H05H 1/2443

See application file for complete search history.

(56) References Cited

U.S. PATENT DOCUMENTS

| | | | |
|---|---|---|---|
| 709,868 | A | 9/1902 | Bradley et al. |
| 1,339,225 | A | 5/1920 | Rose |
| 1,536,612 | A | 5/1925 | Lewis |

(Continued)

FOREIGN PATENT DOCUMENTS

| | | | |
|---|---|---|---|
| AU | 2897071 | A | 11/1972 |
| BG | 98848 | A | 5/1995 |

(Continued)

OTHER PUBLICATIONS

AP-42, Fifth Edition, vol. 1, Chapter 6: Organic Chemical Process Industry, Section 6.1: Carbon Black (1983): 1-10.

(Continued)

*Primary Examiner* — Thai Pham

(74) *Attorney, Agent, or Firm* — Wilson Sonsini Goodrich & Rosati

(57) ABSTRACT

A method and apparatus for operating a DC plasma torch. The power supply used is at least two times the average operating voltage used, resulting in a more stable operation of the torch. The torch can include two concentric cylinder electrodes, the electrodes can be graphite, and the plasma forming gas can be hydrogen. The power supply provided also has the capability of igniting the torch at a pulse voltage of at least 20 kilovolts.

15 Claims, 3 Drawing Sheets

(56) References Cited

U.S. PATENT DOCUMENTS

| | | | | |
|---|---|---|---|---|
| 1,597,277 | A | 8/1926 | Jakowsky | |
| 1,931,800 | A | 10/1933 | Jakosky et al. | |
| 2,002,003 | A | 5/1935 | Otto et al. | |
| 2,039,312 | A | 5/1936 | Goldman | |
| 2,062,358 | A | 12/1936 | Frolich | |
| 2,393,106 | A | 1/1946 | Bernard et al. | |
| 2,557,143 | A | 6/1951 | Royster | |
| 2,572,851 | A | 10/1951 | Daniel et al. | |
| 2,603,669 | A | 7/1952 | Chappell | |
| 2,603,699 | A | 7/1952 | Roper | |
| 2,616,842 | A | 11/1952 | Charles et al. | |
| 2,785,964 | A | 3/1957 | Pollock | |
| 2,850,403 | A | 9/1958 | Day | |
| 2,851,403 | A | 9/1958 | Hale | |
| 2,897,071 | A | 7/1959 | Gilbert | |
| 2,897,869 | A | 8/1959 | Polmanteer | |
| 2,951,143 | A | 8/1960 | Anderson et al. | |
| 3,009,783 | A | 11/1961 | Charles et al. | |
| 3,073,769 | A | 1/1963 | George et al. | |
| 3,127,536 | A | 3/1964 | McLane | |
| 3,253,890 | A | 5/1966 | De et al. | |
| 3,288,696 | A | 11/1966 | Orbach | |
| 3,307,923 | A | 3/1967 | Ruble | |
| 3,308,164 | A | 3/1967 | Shepard | |
| 3,309,780 | A | 3/1967 | Goins | |
| 3,331,664 | A | 7/1967 | Jordan | |
| 3,342,554 | A | 9/1967 | Jordan et al. | |
| 3,344,051 | A | 9/1967 | Latham, Jr. et al. | |
| 3,408,164 | A | 10/1968 | Johnson | |
| 3,409,403 | A | 11/1968 | Geir et al. | |
| 3,420,632 | A | 1/1969 | Ryan et al. | |
| 3,431,074 | A | 3/1969 | Jordan et al. | |
| 3,453,488 | A | 7/1969 | Cann et al. | |
| 3,464,793 | A | 9/1969 | Jordan et al. | |
| 3,619,138 | A | 11/1971 | Gunnell | |
| 3,619,140 | A | 11/1971 | Morgan et al. | |
| 3,637,974 | A | 1/1972 | Tajbl et al. | |
| 3,673,375 | A | 6/1972 | Camacho et al. | |
| 3,725,103 | A | 4/1973 | Jordan et al. | |
| 3,793,438 | A | 2/1974 | Gunnell et al. | |
| 3,852,399 | A | 12/1974 | Rothbuhr et al. | |
| 3,922,335 | A | 11/1975 | Jordan et al. | |
| 3,959,008 | A | 5/1976 | Warner et al. | |
| 3,981,654 | A | 9/1976 | Rood et al. | |
| 3,981,659 | A | 9/1976 | Myers | |
| 3,984,743 | A * | 10/1976 | Horie | H02P 3/14 318/375 |
| 3,998,934 | A | 12/1976 | Vanderveen | |
| 4,019,896 | A | 4/1977 | Appleby | |
| 4,028,072 | A | 6/1977 | Braun et al. | |
| 4,035,336 | A | 7/1977 | Jordan et al. | |
| 4,057,396 | A | 11/1977 | Matovich | |
| 4,075,160 | A | 2/1978 | Mills et al. | |
| 4,088,741 | A | 5/1978 | Takewell | |
| 4,101,639 | A | 7/1978 | Surovikin et al. | |
| 4,138,471 | A | 2/1979 | Lamond et al. | |
| 4,199,545 | A | 4/1980 | Matovich | |
| 4,217,132 | A | 8/1980 | Burge et al. | |
| 4,258,770 | A | 3/1981 | Davis et al. | |
| 4,282,199 | A | 8/1981 | Lamond et al. | |
| 4,289,949 | A | 9/1981 | Raaness et al. | |
| 4,292,291 | A | 9/1981 | Rothbuhr et al. | |
| 4,317,001 | A | 2/1982 | Silver et al. | |
| 4,372,937 | A | 2/1983 | Johnson | |
| 4,404,178 | A | 9/1983 | Johnson et al. | |
| 4,431,624 | A | 2/1984 | Casperson | |
| 4,452,771 | A | 6/1984 | Hunt | |
| 4,460,558 | A | 7/1984 | Johnson | |
| 4,472,172 | A | 9/1984 | Sheer et al. | |
| 4,543,470 | A | 9/1985 | Santen et al. | |
| 4,553,981 | A | 11/1985 | Fuderer | |
| 4,577,461 | A | 3/1986 | Cann | |
| 4,594,381 | A | 6/1986 | Davis | |
| 4,597,776 | A | 7/1986 | Ullman et al. | |
| 4,601,887 | A | 7/1986 | Dorn et al. | |
| 4,678,888 | A | 7/1987 | Camacho et al. | |
| 4,689,199 | A * | 8/1987 | Eckert | C22C 1/026 75/10.1 |
| 4,755,371 | A | 7/1988 | Dickerson | |
| 4,765,964 | A | 8/1988 | Gravley et al. | |
| 4,766,287 | A | 8/1988 | Morrisroe et al. | |
| 4,787,320 | A | 11/1988 | Raaness et al. | |
| 4,797,262 | A | 1/1989 | Dewitz | |
| 4,864,096 | A | 9/1989 | Wolf et al. | |
| 4,977,305 | A | 12/1990 | Severance, Jr. | |
| 5,039,312 | A | 8/1991 | Hollis, Jr. et al. | |
| 5,045,667 | A | 9/1991 | Iceland et al. | |
| 5,046,145 | A | 9/1991 | Drouet | |
| 5,105,123 | A | 4/1992 | Ballou | |
| 5,126,501 | A | 6/1992 | Ellul | |
| 5,138,959 | A | 8/1992 | Kulkarni | |
| 5,147,998 | A | 9/1992 | Tsantrizos et al. | |
| 5,206,880 | A | 4/1993 | Olsson | |
| 5,222,448 | A | 6/1993 | Morgenthaler et al. | |
| 5,352,289 | A | 10/1994 | Weaver et al. | |
| 5,399,957 | A | 3/1995 | Vierboom | |
| 5,427,762 | A | 6/1995 | Steinberg et al. | |
| 5,476,826 | A | 12/1995 | Greenwald et al. | |
| 5,481,080 | A | 1/1996 | Lynum et al. | |
| 5,486,674 | A | 1/1996 | Lynum et al. | |
| 5,500,501 | A | 3/1996 | Lynum et al. | |
| 5,527,518 | A | 6/1996 | Lynum et al. | |
| 5,578,647 | A | 11/1996 | Li et al. | |
| 5,593,644 | A | 1/1997 | Norman et al. | |
| 5,602,298 | A | 2/1997 | Levin | |
| 5,604,424 | A | 2/1997 | Shuttleworth | |
| 5,611,947 | A | 3/1997 | Vavruska | |
| 5,673,285 | A | 9/1997 | Wittle et al. | |
| 5,717,293 | A | 2/1998 | Sellers | |
| 5,725,616 | A | 3/1998 | Lynum et al. | |
| 5,749,937 | A | 5/1998 | Detering et al. | |
| 5,935,293 | A | 8/1999 | Detering et al. | |
| 5,951,960 | A | 9/1999 | Lynum et al. | |
| 5,989,512 | A | 11/1999 | Lynum et al. | |
| 5,997,837 | A | 12/1999 | Lynum et al. | |
| 6,042,643 | A | 3/2000 | Belmont et al. | |
| 6,058,133 | A | 5/2000 | Bowman et al. | |
| 6,068,827 | A | 5/2000 | Lynum et al. | |
| 6,099,696 | A | 8/2000 | Schwob et al. | |
| 6,188,187 | B1 * | 2/2001 | Harlan | H02P 6/08 318/400.06 |
| 6,197,274 | B1 | 3/2001 | Mahmud et al. | |
| 6,277,350 | B1 | 8/2001 | Gerspacher | |
| 6,358,375 | B1 | 3/2002 | Schwob | |
| 6,380,507 | B1 | 4/2002 | Childs | |
| 6,395,197 | B1 | 5/2002 | Detering et al. | |
| 6,403,697 | B1 | 6/2002 | Mitsunaga et al. | |
| 6,441,084 | B1 | 8/2002 | Lee et al. | |
| 6,442,950 | B1 | 9/2002 | Tung | |
| 6,444,727 | B1 | 9/2002 | Yamada et al. | |
| 6,471,937 | B1 | 10/2002 | Anderson et al. | |
| 6,602,920 | B2 | 8/2003 | Hall et al. | |
| 6,703,580 | B2 | 3/2004 | Brunet et al. | |
| 6,773,689 | B1 | 8/2004 | Lynum et al. | |
| 6,955,707 | B2 | 10/2005 | Ezell et al. | |
| 7,167,240 | B2 | 1/2007 | Stagg | |
| 7,294,314 | B2 | 11/2007 | Graham | |
| 7,312,415 | B2 | 12/2007 | Ohmi et al. | |
| 7,360,309 | B2 | 4/2008 | Vaidyanathan et al. | |
| 7,431,909 | B1 | 10/2008 | Rumpf et al. | |
| 7,452,514 | B2 | 11/2008 | Fabry et al. | |
| 7,462,343 | B2 | 12/2008 | Lynum et al. | |
| 7,563,525 | B2 | 7/2009 | Ennis | |
| 7,582,184 | B2 | 9/2009 | Tomita et al. | |
| 7,623,340 | B1 | 11/2009 | Song et al. | |
| 7,635,824 | B2 | 12/2009 | Miki et al. | |
| 7,655,209 | B2 | 2/2010 | Rumpf et al. | |
| 7,777,151 | B2 | 8/2010 | Kuo | |
| 7,847,009 | B2 | 12/2010 | Wong et al. | |
| 7,931,712 | B2 | 4/2011 | Zubrin et al. | |
| 7,968,191 | B2 | 6/2011 | Hampden-Smith et al. | |
| 8,147,765 | B2 | 4/2012 | Muradov et al. | |
| 8,221,689 | B2 | 7/2012 | Boutot et al. | |
| 8,257,452 | B2 | 9/2012 | Menzel | |

(56) References Cited

U.S. PATENT DOCUMENTS 8,277,739 B2 10/2012 Monsen et al.
8,323,793 B2 12/2012 Hamby et al.
8,443,741 B2 5/2013 Chapman et al.
8,471,170 B2 6/2013 Li et al.
8,475,551 B2 7/2013 Tsangaris et al.
8,486,364 B2 7/2013 Vanier et al.
8,501,148 B2 8/2013 Belmont et al.
8,581,147 B2 11/2013 Kooken et al.
8,710,136 B2 4/2014 Yurovskaya et al.
8,771,386 B2 7/2014 Licht et al.
8,784,617 B2 7/2014 Novoselov et al.
8,850,826 B2 10/2014 Ennis
8,871,173 B2 10/2014 Nester et al.
8,911,596 B2 12/2014 Vancina
8,945,434 B2 2/2015 Krause et al.
9,023,928 B2 5/2015 Miyazaki et al.
9,095,835 B2 8/2015 Skoptsov et al.
9,229,396 B1 1/2016 Wu et al.
9,315,735 B2 4/2016 Cole et al.
9,388,300 B2 7/2016 Dikan et al.
9,445,488 B2 9/2016 Foret
9,574,086 B2 2/2017 Johnson et al.
9,679,750 B2 6/2017 Choi et al.
10,100,200 B2 10/2018 Johnson et al.
10,138,378 B2 11/2018 Hoermman et al.
10,370,539 B2 8/2019 Johnson et al.
10,519,299 B2 12/2019 Sevignon et al.
10,618,026 B2 4/2020 Taylor et al.
10,808,097 B2 10/2020 Hardman et al.
11,149,148 B2 10/2021 Taylor et al.
11,203,692 B2 12/2021 Hoermann et al.
11,263,217 B2 3/2022 Zimovnov et al.
11,304,288 B2 4/2022 Hoermann et al.
11,453,784 B2 9/2022 Hardman et al.
11,492,496 B2 11/2022 Hoermann et al.
11,591,477 B2 2/2023 Johnson et al.
11,665,808 B2 5/2023 Moss et al.
11,987,712 B2 5/2024 Hardman et al.
11,998,886 B2 6/2024 Taylor et al.
2001/0029888 A1 10/2001 Sundarrajan et al.
2001/0039797 A1 11/2001 Cheng
2002/0000085 A1 1/2002 Hall et al.
2002/0021430 A1 2/2002 Koshelev et al.
2002/0050323 A1 5/2002 Moisan et al.
2002/0051903 A1 5/2002 Masuko et al.
2002/0141476 A1 10/2002 Varela
2002/0157559 A1* 10/2002 Brunet .................... C06D 5/06 102/472
2003/0103858 A1 6/2003 Baran et al.
2003/0136661 A1 7/2003 Kong et al.
2003/0152184 A1 8/2003 Shehane et al.
2004/0001626 A1 1/2004 Baudry et al.
2004/0045808 A1 3/2004 Fabry et al.
2004/0047779 A1 3/2004 Denison
2004/0071626 A1 4/2004 Smith et al.
2004/0081609 A1 4/2004 Green et al.
2004/0081862 A1* 4/2004 Herman .................... C01B 3/24 429/513
2004/0148860 A1 8/2004 Fletcher
2004/0168904 A1 9/2004 Anazawa et al.
2004/0211760 A1 10/2004 Delzenne et al.
2004/0213728 A1 10/2004 Kopietz et al.
2004/0216559 A1 11/2004 Kim et al.
2004/0247509 A1 12/2004 Newby
2005/0063892 A1 3/2005 Tandon et al.
2005/0063893 A1 3/2005 Ayala et al.
2005/0079119 A1 4/2005 Kawakami et al.
2005/0230240 A1 10/2005 Dubrovsky et al.
2006/0034748 A1 2/2006 Lewis et al.
2006/0037244 A1 2/2006 Clawson
2006/0068987 A1 3/2006 Bollepalli et al.
2006/0107789 A1* 5/2006 Deegan .................... H05H 1/42 75/346
2006/0155157 A1 7/2006 Zarrinpashne et al.
2006/0226538 A1 10/2006 Kawata
2006/0228290 A1 10/2006 Green
2006/0239890 A1 10/2006 Chang et al.
2007/0010606 A1 1/2007 Hergenrother et al.
2007/0104636 A1 5/2007 Kutsovsky et al.
2007/0140004 A1 6/2007 Marotta et al.
2007/0183959 A1 8/2007 Charlier et al.
2007/0270511 A1 11/2007 Melnichuk et al.
2007/0293405 A1 12/2007 Zhang et al.
2008/0041829 A1 2/2008 Blutke et al.
2008/0121624 A1 5/2008 Belashchenko et al.
2008/0159947 A1 7/2008 Yurovskaya et al.
2008/0169183 A1 7/2008 Hertel et al.
2008/0182298 A1 7/2008 Day
2008/0226538 A1 9/2008 Rumpf et al.
2008/0233402 A1 9/2008 Carlson et al.
2008/0263954 A1 10/2008 Hammel et al.
2008/0279749 A1 11/2008 Probst et al.
2008/0286574 A1 11/2008 Hamby et al.
2008/0292533 A1 11/2008 Belmont et al.
2009/0014423 A1 1/2009 Li et al.
2009/0035469 A1 2/2009 Sue et al.
2009/0090282 A1 4/2009 Gold et al.
2009/0142250 A1 6/2009 Fabry et al.
2009/0155157 A1 6/2009 Stenger et al.
2009/0173252 A1 7/2009 Nakata et al.
2009/0208751 A1 8/2009 Green et al.
2009/0230098 A1 9/2009 Salsich et al.
2010/0055017 A1 3/2010 Vanier et al.
2010/0147188 A1 6/2010 Mamak et al.
2010/0249353 A1 9/2010 Macintosh et al.
2011/0036014 A1 2/2011 Tsangaris et al.
2011/0071692 A1 3/2011 D'Amato et al.
2011/0071962 A1 3/2011 Lim
2011/0076608 A1 3/2011 Bergemann et al.
2011/0089115 A1 4/2011 Lu
2011/0120137 A1 5/2011 Ennis
2011/0138766 A1 6/2011 Elkady et al.
2011/0150756 A1 6/2011 Adams et al.
2011/0155703 A1 6/2011 Winn
2011/0174407 A1 7/2011 Lundberg et al.
2011/0180513 A1 7/2011 Luhrs et al.
2011/0214425 A1 9/2011 Lang et al.
2011/0217229 A1 9/2011 Inomata et al.
2011/0236816 A1 9/2011 Stanyschofsky et al.
2011/0239542 A1 10/2011 Liu et al.
2012/0018402 A1 1/2012 Carducci et al.
2012/0025693 A1 2/2012 Wang et al.
2012/0177531 A1 7/2012 Chuang et al.
2012/0201266 A1 8/2012 Boulos, I et al.
2012/0232173 A1 9/2012 Juranitch et al.
2012/0292794 A1 11/2012 Prabhu et al.
2013/0039841 A1 2/2013 Nester et al.
2013/0062195 A1 3/2013 Samaranayake et al.
2013/0062196 A1 3/2013 Sin
2013/0092525 A1 4/2013 Li et al.
2013/0105739 A1 5/2013 Bingue et al.
2013/0126485 A1 5/2013 Foret
2013/0194840 A1* 8/2013 Huselstein .............. H02M 1/32 363/50
2013/0292363 A1 11/2013 Hwang et al.
2013/0323614 A1 12/2013 Chapman et al.
2013/0340651 A1 12/2013 Wampler et al.
2014/0000488 A1 1/2014 Sekiyama et al.
2014/0013996 A1 1/2014 Dikan et al.
2014/0027411 A1* 1/2014 Voronin ................... H05H 1/34 219/121.48
2014/0057166 A1 2/2014 Yokoyama et al.
2014/0131324 A1* 5/2014 Shipulski ............. B23K 10/006 219/121.54
2014/0151601 A1 6/2014 Hyde et al.
2014/0166496 A1 6/2014 Lin et al.
2014/0190179 A1 7/2014 Baker et al.
2014/0224706 A1 8/2014 Do et al.
2014/0227165 A1 8/2014 Hung et al.
2014/0248442 A1 9/2014 Luizi et al.
2014/0290532 A1 10/2014 Rodriguez et al.
2014/0294716 A1 10/2014 Susekov et al.
2014/0339478 A1 11/2014 Probst et al.
2014/0345828 A1 11/2014 Ehmann et al.

(56) References Cited

U.S. PATENT DOCUMENTS

| | | | |
|---|---|---|---|
| 2014/0357092 A1 | 12/2014 | Singh | |
| 2014/0373752 A2 | 12/2014 | Hassinen et al. | |
| 2015/0004516 A1 | 1/2015 | Kim et al. | |
| 2015/0044105 A1 | 2/2015 | Novoselov | |
| 2015/0044516 A1 | 2/2015 | Kyrlidis et al. | |
| 2015/0056127 A1 | 2/2015 | Chavan et al. | |
| 2015/0056516 A1 | 2/2015 | Hellring et al. | |
| 2015/0064099 A1 | 3/2015 | Nester et al. | |
| 2015/0087764 A1 | 3/2015 | Sanchez Garcia et al. | |
| 2015/0180346 A1* | 6/2015 | Yuzurihara | H05H 1/48 315/127 |
| 2015/0210856 A1 | 7/2015 | Johnson et al. | |
| 2015/0210857 A1 | 7/2015 | Johnson et al. | |
| 2015/0210858 A1 | 7/2015 | Hoermann et al. | |
| 2015/0211378 A1 | 7/2015 | Johnson et al. | |
| 2015/0217940 A1 | 8/2015 | Si et al. | |
| 2015/0218383 A1 | 8/2015 | Johnson et al. | |
| 2015/0223314 A1 | 8/2015 | Hoermann et al. | |
| 2015/0252168 A1 | 9/2015 | Schuck et al. | |
| 2015/0259211 A9 | 9/2015 | Hung et al. | |
| 2015/0307351 A1 | 10/2015 | Mabrouk et al. | |
| 2016/0030856 A1 | 2/2016 | Kaplan et al. | |
| 2016/0152469 A1 | 6/2016 | Chakravarti et al. | |
| 2016/0210856 A1 | 7/2016 | Assenbaum et al. | |
| 2016/0243518 A1 | 8/2016 | Spitzl | |
| 2016/0293959 A1 | 10/2016 | Blizanac et al. | |
| 2016/0296905 A1 | 10/2016 | Kuhl | |
| 2016/0319110 A1 | 11/2016 | Matheu et al. | |
| 2017/0034898 A1 | 2/2017 | Moss et al. | |
| 2017/0037253 A1 | 2/2017 | Hardman et al. | |
| 2017/0058128 A1 | 3/2017 | Johnson et al. | |
| 2017/0066923 A1 | 3/2017 | Hardman et al. | |
| 2017/0073522 A1 | 3/2017 | Hardman et al. | |
| 2017/0117538 A1 | 4/2017 | Bendimerad et al. | |
| 2017/0349758 A1 | 12/2017 | Johnson et al. | |
| 2018/0015438 A1 | 1/2018 | Taylor et al. | |
| 2018/0016441 A1 | 1/2018 | Taylor et al. | |
| 2018/0022925 A1 | 1/2018 | Hardman et al. | |
| 2018/0148506 A1 | 5/2018 | Png et al. | |
| 2018/0340074 A1 | 11/2018 | Wittmann et al. | |
| 2018/0366734 A1 | 12/2018 | Korchev et al. | |
| 2019/0048200 A1 | 2/2019 | Johnson et al. | |
| 2019/0100658 A1 | 4/2019 | Taylor et al. | |
| 2019/0153234 A1 | 5/2019 | Hoermann et al. | |
| 2019/0232718 A1 | 8/2019 | Halasa et al. | |
| 2019/0338139 A1 | 11/2019 | Hoermann et al. | |
| 2020/0140691 A1 | 5/2020 | Johnson et al. | |
| 2020/0239696 A1 | 7/2020 | Johnson et al. | |
| 2020/0239697 A1 | 7/2020 | Wittmann et al. | |
| 2020/0291237 A1 | 9/2020 | Hardman et al. | |
| 2021/0017025 A1 | 1/2021 | Hardman | |
| 2021/0017031 A1 | 1/2021 | Hardman et al. | |
| 2021/0020947 A1 | 1/2021 | Hardman et al. | |
| 2021/0071007 A1 | 3/2021 | Hardman et al. | |
| 2021/0120658 A1 | 4/2021 | Moss et al. | |
| 2021/0261417 A1 | 8/2021 | Cardinal et al. | |
| 2022/0272826 A1 | 8/2022 | Hoermann et al. | |
| 2022/0274046 A1 | 9/2022 | Johnson et al. | |
| 2022/0339595 A1 | 10/2022 | Taylor et al. | |
| 2023/0136364 A1 | 5/2023 | Johnson et al. | |
| 2023/0154640 A1 | 5/2023 | Ned et al. | |
| 2023/0212401 A1 | 7/2023 | Hardman et al. | |
| 2023/0257260 A1 | 8/2023 | Kacem et al. | |
| 2023/0357021 A1 | 11/2023 | Hanson et al. | |
| 2024/0093035 A1 | 3/2024 | Hardman et al. | |

FOREIGN PATENT DOCUMENTS

| | | | |
|---|---|---|---|
| CA | 830378 | A | 12/1969 |
| CA | 964405 | A | 3/1975 |
| CA | 2353752 | A1 | 1/2003 |
| CA | 2621749 | A1 | 8/2009 |
| CA | 3060482 | A1 | 11/2017 |
| CN | 85201622 | U | 7/1986 |
| CN | 86104761 | A | 2/1987 |
| CN | 85109166 | A | 4/1987 |
| CN | 1059541 | A | 3/1992 |
| CN | 1076206 | A | 9/1993 |
| CN | 1077329 | A | 10/1993 |
| CN | 1078727 | A | 11/1993 |
| CN | 1082571 | A | 2/1994 |
| CN | 1086527 | A | 5/1994 |
| CN | 1196032 | A | 10/1998 |
| CN | 1398780 | A | 2/2003 |
| CN | 1458966 | A | 11/2003 |
| CN | 1491740 | A | 4/2004 |
| CN | 1644650 | A | 7/2005 |
| CN | 1656632 | A | 8/2005 |
| CN | 1825531 | A | 8/2006 |
| CN | 1833313 | A | 9/2006 |
| CN | 101092691 | A | 12/2007 |
| CN | 101143296 | A | 3/2008 |
| CN | 101193817 | A | 6/2008 |
| CN | 101198442 | A | 6/2008 |
| CN | 201087175 | Y | 7/2008 |
| CN | 201143494 | Y | 11/2008 |
| CN | 101335343 | A | 12/2008 |
| CN | 101368010 | A | 2/2009 |
| CN | 101529606 | A | 9/2009 |
| CN | 101534930 | A | 9/2009 |
| CN | 101657283 | A | 2/2010 |
| CN | 101734620 | A | 6/2010 |
| CN | 101946080 | A | 1/2011 |
| CN | 101958221 | A | 1/2011 |
| CN | 102007186 | A | 4/2011 |
| CN | 102060281 | A | 5/2011 |
| CN | 102108216 | A | 6/2011 |
| CN | 102186767 | A | 9/2011 |
| CN | 102350506 | A | 2/2012 |
| CN | 102612549 | A | 7/2012 |
| CN | 102666686 | A | 9/2012 |
| CN | 102702801 | A | 10/2012 |
| CN | 202610344 | U | 12/2012 |
| CN | 102869730 | A | 1/2013 |
| CN | 102993788 | A | 3/2013 |
| CN | 103108831 | A | 5/2013 |
| CN | 103160149 | A | 6/2013 |
| CN | 103391678 | A | 11/2013 |
| CN | 203269847 | U | 11/2013 |
| CN | 203415580 | U | 1/2014 |
| CN | 204301483 | U | 4/2015 |
| CN | 104798228 | A | 7/2015 |
| CN | 105070518 | A | 11/2015 |
| CN | 105073906 | A | 11/2015 |
| CN | 105308775 | A | 2/2016 |
| CN | 205472672 | U | 8/2016 |
| CN | 107709474 | A | 2/2018 |
| DE | 211457 | A3 | 7/1984 |
| DE | 19807224 | A1 | 8/1999 |
| EA | 200300389 | A1 | 12/2003 |
| EP | 0315442 | A2 | 5/1989 |
| EP | 0325689 | A1 | 8/1989 |
| EP | 0616600 | A1 | 9/1994 |
| EP | 0635044 | B1 | 2/1996 |
| EP | 0635043 | B1 | 6/1996 |
| EP | 0861300 | A1 | 9/1998 |
| EP | 0982378 | A1 | 3/2000 |
| EP | 1017622 | A1 | 7/2000 |
| EP | 1088854 | A2 | 4/2001 |
| EP | 1188801 | A1 | 3/2002 |
| EP | 3099397 | A1 | 12/2016 |
| EP | 3100597 | A2 | 12/2016 |
| EP | 3253826 | A1 | 12/2017 |
| EP | 3253827 | A1 | 12/2017 |
| EP | 3253904 | A1 | 12/2017 |
| EP | 3331821 | A1 | 6/2018 |
| EP | 3347306 | A1 | 7/2018 |
| EP | 3350855 | A1 | 7/2018 |
| EP | 3448553 | A1 | 3/2019 |
| EP | 3448936 | A1 | 3/2019 |
| EP | 3592810 | A1 | 1/2020 |
| EP | 3612600 | A1 | 2/2020 |
| EP | 3676220 | A1 | 7/2020 |

(56) References Cited

FOREIGN PATENT DOCUMENTS

| | | | | |
|---|---|---|---|---|
| EP | 3676335 | A1 | 7/2020 | |
| EP | 3676901 | A1 | 7/2020 | |
| EP | 3700980 | A1 | 9/2020 | |
| EP | 3774020 | A1 | 2/2021 | |
| EP | 4225698 | A1 | 8/2023 | |
| FR | 1249094 | A | 12/1960 | |
| FR | 2891434 | A1 | 3/2007 | |
| FR | 2937029 | A1 | 4/2010 | |
| FR | 3112767 | B1 | 5/2023 | |
| GB | 395893 | A | 7/1933 | |
| GB | 987498 | A | 3/1965 | |
| GB | 1068519 | | 5/1967 | |
| GB | 1068519 | A | 5/1967 | |
| GB | 1291487 | A | 10/1972 | |
| GB | 1400266 | A | 7/1975 | |
| GB | 1492346 | A | 11/1977 | |
| GB | 2419883 | A | 5/2006 | |
| JP | S5021983 | B1 | 7/1975 | |
| JP | S5987800 | A | 5/1984 | |
| JP | S6411074 | A | 1/1989 | |
| JP | H04228270 | A | 8/1992 | |
| JP | H05226096 | A | 9/1993 | |
| JP | H06302527 | A | 10/1994 | |
| JP | H06322615 | A | 11/1994 | |
| JP | H07500695 | A | 1/1995 | |
| JP | H07307165 | A | 11/1995 | |
| JP | H08176463 | A | 7/1996 | |
| JP | H08319552 | A | 12/1996 | |
| JP | H09316645 | A | 12/1997 | |
| JP | H11123562 | A | 5/1999 | |
| JP | 2001085014 | A | 3/2001 | |
| JP | 2001164053 | A | 6/2001 | |
| JP | 2001253974 | A | 9/2001 | |
| JP | 2002121422 | A | 4/2002 | |
| JP | 2002203551 | A | 7/2002 | |
| JP | 2004300334 | A | 10/2004 | |
| JP | 3636623 | B2 | 4/2005 | |
| JP | 2005235709 | A | 9/2005 | |
| JP | 2005243410 | A | 9/2005 | |
| JP | 2007505975 | A | 3/2007 | |
| JP | 2010525142 | A | 7/2010 | |
| JP | 2012505939 | A | 3/2012 | |
| JP | 5226096 | B2 | 7/2013 | |
| JP | 2016526257 | A | 9/2016 | |
| KR | 19980703132 | A | 10/1998 | |
| KR | 20030046455 | A | 6/2003 | |
| KR | 20080105344 | A | 12/2008 | |
| KR | 20140022263 | A | 2/2014 | |
| KR | 20140075261 | A | 6/2014 | |
| KR | 20150121142 | A | 10/2015 | |
| KR | 20170031061 | A | 3/2017 | |
| RU | 2425795 | C2 | 8/2011 | |
| RU | 2488984 | C2 | 7/2013 | |
| TW | 200418933 | A | 10/2004 | |
| WO | WO-9004852 | A1 | 5/1990 | |
| WO | WO-9204415 | A1 | 3/1992 | |
| WO | WO-9312030 | A1 | 6/1993 | |
| WO | WO-9312031 | A1 | 6/1993 | |
| WO | WO-9312633 | A1 | 6/1993 | |
| WO | WO-9318094 | A1 | 9/1993 | |
| WO | WO-9320152 | A1 | 10/1993 | |
| WO | WO-9320153 | A1 | 10/1993 | |
| WO | WO-9323331 | A1 | 11/1993 | |
| WO | WO-9408747 | A1 * | 4/1994 | ............. B23K 10/00 |
| WO | WO-9618688 | A1 | 6/1996 | |
| WO | WO-9629710 | A1 | 9/1996 | |
| WO | WO-9703133 | A1 | 1/1997 | |
| WO | WO-9813428 | A1 | 4/1998 | |
| WO | WO-0018682 | A1 | 4/2000 | |
| WO | WO-0192151 | A1 | 12/2001 | |
| WO | WO-0224819 | A1 | 3/2002 | |
| WO | WO-03014018 | A1 | 2/2003 | |
| WO | WO-2004083119 | A1 | 9/2004 | |
| WO | WO-2005054378 | A1 | 6/2005 | |
| WO | WO-2007016418 | A2 | 2/2007 | |
| WO | WO-2009143576 | A1 | 12/2009 | |
| WO | WO-2010040840 | A2 | 4/2010 | |
| WO | WO-2010059225 | A1 | 5/2010 | |
| WO | WO-2012015313 | A1 | 2/2012 | |
| WO | WO-2012067546 | A2 | 5/2012 | |
| WO | WO-2012094743 | A1 | 7/2012 | |
| WO | WO-2012149170 | A1 | 11/2012 | |
| WO | WO-2013134093 | A1 | 9/2013 | |
| WO | WO-2013184074 | A1 | 12/2013 | |
| WO | WO-2013185219 | A1 | 12/2013 | |
| WO | WO-2014000108 | A1 | 1/2014 | |
| WO | WO-2014012169 | A1 | 1/2014 | |
| WO | WO-2014149455 | A1 | 9/2014 | |
| WO | WO-2015049008 | A1 | 4/2015 | |
| WO | WO-2015051893 | A1 | 4/2015 | |
| WO | WO-2015051898 | A1 | 4/2015 | |
| WO | WO-2015093947 | A1 | 6/2015 | |
| WO | WO-2015116797 | A1 | 8/2015 | |
| WO | WO-2015116798 | A1 | 8/2015 | |
| WO | WO-2015116800 | A1 | 8/2015 | |
| WO | WO-2015116807 | A1 | 8/2015 | |
| WO | WO-2015116811 | A1 | 8/2015 | |
| WO | WO-2015116943 | A2 | 8/2015 | |
| WO | WO-2015129683 | A1 | 9/2015 | |
| WO | WO-2016012367 | A1 | 1/2016 | |
| WO | WO-2016014641 | A1 | 1/2016 | |
| WO | WO-2016126598 | A1 | 8/2016 | |
| WO | WO-2016126599 | A1 | 8/2016 | |
| WO | WO-2016126600 | A1 | 8/2016 | |
| WO | WO-2017019683 | A1 | 2/2017 | |
| WO | WO-2017027385 | A1 | 2/2017 | |
| WO | WO-2017034980 | A1 | 3/2017 | |
| WO | WO-2017044594 | A1 | 3/2017 | |
| WO | WO-2017048621 | A1 | 3/2017 | |
| WO | WO-2017190015 | A1 | 11/2017 | |
| WO | WO-2017190045 | A1 | 11/2017 | |
| WO | WO-2018165483 | A1 | 9/2018 | |
| WO | WO-2018195460 | A1 | 10/2018 | |
| WO | WO-2019046320 | A1 | 3/2019 | |
| WO | WO-2019046322 | A1 | 3/2019 | |
| WO | WO-2019046324 | A1 | 3/2019 | |
| WO | WO-2019084200 | A1 | 5/2019 | |
| WO | WO-2019195461 | A1 | 10/2019 | |
| WO | WO-2022076306 | | 4/2022 | |
| WO | WO-2022076306 | A1 | 4/2022 | |
| WO | WO-2023059520 | | 4/2023 | |
| WO | WO-2023059520 | A1 | 4/2023 | |
| WO | WO-2023137120 | A1 | 7/2023 | |
| WO | WO-2023235486 | A1 | 12/2023 | |
| WO | WO-2024086782 | | 4/2024 | |
| WO | WO-2024086831 | | 4/2024 | |

OTHER PUBLICATIONS

ASTM International: Standard Test Method for Carbon Black-Morphological Characterization of Carbon Black Using Electron Microscopy, D3849-07 (2011); 7 Pages.

Ayala, et al., Carbon Black Elastomer Interaction. Rubber Chemistry and Technology (1991): 19-39.

Bakken, et al., Thermal plasma process development in Norway. Pure and Applied Chemistry 70.6 (1998): 1223-1228.

Biscoe, et al., An X-ray study of carbon black. Journal of Applied physics, 1942; 13: 364-371.

Boehm, Some Aspects of Surface Chemistry of Carbon Blacks and Other Carbons. Carbon. 32.5. (1994): 759-769.

Breeze, Raising steam plant efficiency-Pushing the steam cycle boundaries.PEI Magazine 20.4 (2012) 12 pages.

Carmer, et al., Formation of silicon carbide particles behind shock waves. Appl. Phys. Lett. 54 (15), Apr. 10, 1989. 1430-1432.

Cataldo, The impact of a fullerene-like concept in carbon black science. Carbon 40 (2002): 157-162.

Chiesa, et al., Using Hydrogen as Gas Turbine Fuel. Asme. J. Eng. Gas Turbines Power 127.1. (2005):73-80. doi:10.1115/1.1787513.

Cho, et al., Conversion of natural gas to hydrogen and carbon black by plasma and application of plasma black. Symposia-American Chemical Society, Div. Fuel Chem. 49.1. (2004): 181-183.

(56) References Cited

OTHER PUBLICATIONS

Co-pending U.S. Appl. No. 16/807,550, inventors Taylor; Roscoe W. et al., filed Mar. 3, 2020.
Co-pending U.S. Appl. No. 17/021,197, inventors Hardman; Ned J. et al., filed Sep. 15, 2020.
Co-pending U.S. Appl. No. 17/031,484, inventors Johnson; Peter L. et al., filed Sep. 24, 2020.
Co-pending U.S. Appl. No. 17/072,416, inventors Taylor; Roscoe W. et al., filed Oct. 16, 2020.
Co-pending U.S. Appl. No. 17/239,041, inventors Hardmanned; J. et al., filed Apr. 23, 2021.
Co-pending U.S. Appl. No. 17/245,296, inventors Johnsonpeter; L. et al., filed Apr. 30, 2021.
Co-pending U.S. Appl. No. 17/329,532, inventors Taylorroscoe; W. et al., filed May 25, 2021.
Co-pending U.S. Appl. No. 17/412,913, inventors Johnson; Peter L. et al., filed Aug. 26, 2021.
Co-pending U.S. Appl. No. 17/473,106, inventors Taylorroscoe; W. et al., filed Sep. 13, 2021.
Co-pending U.S. Appl. No. 17/487,982, inventors Hoermannalexander; F. et al., filed Sep. 28, 2021.
Co-pending U.S. Appl. No. 17/529,928, inventors Hardmanned; J. et al., filed Nov. 18, 2021.
Co-pending U.S. Appl. No. 17/741,161, inventors Hoermann; Alexander F. et al., filed May 10, 2022.
Co-pending U.S. Appl. No. 17/862,242, inventors Hardman; Ned J. et al., filed Jul. 11, 2022.
Co-pending U.S. Appl. No. 17/938,304, inventors Roscoe; W. Taylor et al., filed Oct. 5, 2022.
Co-pending U.S. Appl. No. 17/938,591, inventors Alexander; F. Hoermann et al., filed Oct. 6, 2022.
Co-pending U.S. Appl. No. 18/066,929, inventor Alexander; F. Hoermann, filed Dec. 15, 2022.
Co-pending U.S. Appl. No. 18/172,835, inventor Ned; J. Hardman, filed Feb. 22, 2023.
Co-pending U.S. Appl. No. 18/205,384, inventors Ned; J. Hardman et al., filed Jun. 2, 2023.
Co-pending U.S. Appl. No. 18/295,584, inventors Robert; J. Hanson et al., filed Apr. 4, 2023.
Database WPI, Week 200323, 2017 Clarivate Analytics. Thomson Scientific, London, GB; Database accession No. 2003-239603, XP002781693.
Donnet, et al., Carbon Black. New York: Marcel Dekker, (1993): 46, 47 and 54.
Donnet, et al., Observation of Plasma-Treated Carbon Black Surfaces by Scanning Tunnelling Microscopy. Carbon (1994) 32(2): 199-206.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.
EP18869902.9 Extended European Search Report dated Mar. 19, 2021.
EP19780959.3 Extended European Search Report dated Dec. 21, 2021.
Extended European Search Report for EP Application No. 15742910.1 dated Jul. 18, 2017.
Extended European Search Report for EP Application No. 15743214.7 dated Jan. 16, 2018.
Extended European Search Report for EP Application No. 16747055.8, dated Jun. 27, 2018.
Extended European Search Report for EP Application No. 16747056.6 dated Jun. 27, 2018.
Extended European Search Report for EP Application No. 16747057.4 dated Oct. 9, 2018.
Extended European Search Report for EP Application No. 16835697.0 dated Nov. 28, 2018.
Fabry, et al., Carbon black processing by thermal plasma. Analysis of the particle formation mechanism. Chemical Engineering Science 56.6 (2001): 2123-2132.
Frenklach, et al., Silicon carbide and the origin of interstellar carbon grains. Nature, vol. 339; May 18, 1989: 196-198.
Fulcheri, et al., From methane to hydrogen, carbon black and water. International journal of hydrogen energy 20.3 (1995): 197-202.
Fulcheri, et al., Plasma processing: a step towards the production of new grades of carbon black. Carbon 40.2 (2002): 169-176.
Gago, et al., Growth mechanisms and structure of fullerene-like carbon-based thin films: superelastic materials for tribological applications. Trends in Fullerene Research, Published by Nova Science Publishers, Inc. (2007): 1-46.
Garberg, et al.,A transmission electron microscope and electron diffraction study of carbon nanodisks. Carbon 46.12 (2008): 1535-1543.
Gomez-Pozuelo, et al., Hydrogen production by catalytic methane decomposition over rice husk derived silica. Fuel, Dec. 15, 2021; 306: 121697.
Grivei, et al., A clean process for carbon nanoparticles and hydrogen production from plasma hydrocarbon cracking. Publishable Report, European Commission JOULE III Programme, Project No. JOE3-CT97-0057, circa (2000): 1-25.
Hernandez, et al. Comparison of carbon nanotubes and nanodisks as percolative fillers in electrically conductive composites. Scripta Materialia 58 (2008) 69-72.
Hoyer, et al., Microelectromechanical strain and pressure sensors based on electric field aligned carbon cone and carbon black particles in a silicone elastomer matrix. Journal of Applied Physics 112.9 (2012): 094324.
International Preliminary Report on Patentability for Application No. PCT/US2015/013482 dated Aug. 2, 2016.
International Preliminary Report on Patentability for Application No. PCT/US2015/013484 dated Aug. 2, 2016.
International Preliminary Report on Patentability for Application No. PCT/US2015/013487 dated Aug. 2, 2016.
International Preliminary Report on Patentability for Application No. PCT/US2015/013505 dated Aug. 2, 2016.
International Preliminary Report on Patentability for Application No. PCT/US2015/013510 dated Aug. 2, 2016.
International Preliminary Report on Patentability for Application No. PCT/US2017/030139 dated Oct. 30, 2018.
International Preliminary Report on Patentability for Application No. PCT/US2017/030179 dated Oct. 30, 2018.
International Search Report and Written Opinion for Application No. PCT/US2015/013482 dated Jun. 17, 2015.
International Search Report and Written Opinion for Application No. PCT/US2015/013484 dated Apr. 22, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report and Written Opinion for Application No. PCT/US2015/013794 dated Jun. 19, 2015.
International Search Report and Written Opinion for Application No. PCT/US2016/015939 dated Jun. 3, 2016.
International Search Report and Written Opinion for Application No. PCT/US2016/015941 dated Apr. 21, 2016.

(56) References Cited

OTHER PUBLICATIONS

International Search Report and Written Opinion for Application No. PCT/US2016/015942 dated Apr. 11, 2016.
International search Report and Written Opinion for Application No. PCT/US2016/044039 dated Oct. 6, 2016.
International Search Report and Written Opinion for Application No. PCT/US2016/045793 dated Oct. 18, 2016.
International Search Report and Written Opinion for Application No. PCT/US2016/047769 dated Dec. 30, 2016.
International Search Report and Written Opinion for Application No. PCT/US2016/050728 dated Nov. 18, 2016.
International search Report and Written Opinion for Application No. PCT/US2016/051261 dated Nov. 18, 2016.
International Search Report and Written Opinion for Application No. PCT/US2017/030139 dated Jul. 19, 2017.
International Search Report and Written Opinion for Application No. PCT/US2017/030179 dated Jul. 27, 2017.
International Search Report and Written Opinion for Application No. PCT/US2018/021627 dated May 31, 2018.
International Search Report and Written Opinion for Application No. PCT/US2018/028619 dated Aug. 9, 2018.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report for Application No. PCT/US2015/13482 dated Jun. 17, 2015.
International Search Report for Application No. PCT/US2015/13487 dated Jun. 16, 2015.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
Knaapila, et al., Directed assembly of carbon nanocones into wires with an epoxy coating in thin films by a combination of electric field alignment and subsequent pyrolysis. Carbon 49.10 (2011): 3171-3178.
Krishnan, et al., Graphitic cones and the nucleation of curved carbon surfaces. Nature 388.6641 (1997): 451-454.
Larouche, et al., Nitrogen Functionalization of Carbon Black in a Thermo-Convective Plasma Reactor. Plasma Chem Plasma Process (2011) 31: 635-647.
Lee, et al., Application of Thermal Plasma for Production of Hydrogen and Carbon Black from Direct Decomposition of Hydrocarbon, Appl. Chem. Eng., vol. 18, No. 1, Feb. 2007, pp. 84-89.
Long C. M., et al., "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
Medalia, et al., Tinting Strength of Carbon Black. Journal of Colloid and Interface Science 40.2. (1972).
Naess, et al., Carbon nanocones: wall structure and morphology. Science and Technology of advanced materials (2009): 7 pages.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
PCT/US2021/053371 International Search Report and Written Opinion dated Feb. 17, 2022.
PCT/US2022/045451 International Search Report and Written Opinion dated Feb. 17, 2023.
PCT/US2023/010695 International Search Report and Written Opinion dated Jun. 22, 2023.
Polman, et al., Reduction of CO2 emissions by adding hydrogen to natural gas. IEA Green House Gas R&D programme (2003): 1-98.
Pristavita, et al. Carbon blacks produced by thermal plasma: the influence of the reactor geometry on the product morphology. Plasma Chemistry and Plasma Processing 30.2 (2010): 267-279.
Pristavita, et al., Carbon nanoparticle production by inductively coupled thermal plasmas: controlling the thermal history of particle nucleation. Plasma Chemistry and Plasma Processing 31.6 (2011): 851-866.
Pristavita, et al., Volatile Compounds Present in Carbon Blacks Produced by Thermal Plasmas. Plasma Chemistry and Plasma Processing 31.6 (2011): 839-850.
Reese, Resurgence in American manufacturing will be led by the rubber and tire industry. Rubber World. 255. (2017): 18-21 and 23.
Reynolds, Electrode Resistance: How Important is Surface Area. Oct. 10, 2016. p. 3 para[0001]; Figure 3; Retrieved from http://electrotishing.net/2016/10/10/electrode-resistance-how-important-is-surface-area/ on May 8, 2018.
Search Report for Application No. RU2016135213 dated Feb. 12, 2018.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
Sun, et al., Preparation of carbon black via arc discharge plasma enhanced by thermal pyrolysis. Diamond & Related Materials (2015), doi: 10.1016/j.diamond.2015.11.004, 47 pages.
Supplementary Partial European Search Report for EP Application No. 15743214.7 dated Sep. 12, 2017.
Translation of Official Notification of RU Application No. 2016135213 dated Feb. 12, 2018.
Tsujikawa, et al., Analysis of a gas turbine and steam turbine combined cycle with liquefied hydrogen as fuel. International Journal of Hydrogen Energy 7.6 (1982): 499-505.
U.S. Appl. No. 16/657,386 Notice of Allowance dated May 20, 2022.
U.S. Appl. No. 14/591,541 Notice of Allowance dated Sep. 17, 2018.
U.S. Environmental Protection Agency, Guide to Industrial Assessments for Pollution Prevention and Energy Efficiency. EPA 625/R-99/003 (1999): 474 pages.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,476 Office Action dated Feb. 27, 2017.
U.S. Appl. No. 14/591,476 Office Action dated Jul. 11, 2016.
U.S. Appl. No. 14/591,476 Office Action dated Jun. 7, 2018.
U.S. Appl. No. 14/591,476 Office Action dated Mar. 16, 2016.
U.S. Appl. No. 14/591,476 Office Action dated Oct. 13, 2017.
U.S. Appl. No. 14/591,528 Office Action dated Jan. 16, 2018.
U.S. Appl. No. 14/591,528 Office Action dated Jan. 17, 2019.
U.S. Appl. No. 14/591,528 Office Action dated Oct. 28, 2019.
U.S. Appl. No. 14/591,528 Office Action dated Sep. 11, 2020.
U.S. Appl. No. 14/591,541 Notice of Allowance dated Jun. 7, 2018.
U.S. Appl. No. 14/591,541 Office Action dated Feb. 22, 2017.
U.S. Appl. No. 14/591,541 Office Action dated Jul. 14, 2016.
U.S. Appl. No. 14/591,541 Office Action dated Mar. 16, 2016.
U.S. Appl. No. 14/591,541 Office Action dated Oct. 13, 2017.
U.S. Appl. No. 14/601,761 Corrected Notice of Allowance dated Feb. 9, 2018.
U.S. Appl. No. 14/601,761 Ex Parte Quayle Actionn dated May 19, 2017.
U.S. Appl. No. 14/601,761 Notice of Allowance dated Feb. 9, 2018.
U.S. Appl. No. 14/601,761 Notice of Allowance dated Jan. 18, 2018.
U.S. Appl. No. 14/601,761 Notice of Allowance dated Jun. 19, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/601,761 Office Action dated Apr. 14, 2016.

(56) References Cited

OTHER PUBLICATIONS

U.S. Appl. No. 14/601,761 Office Action dated Oct. 19, 2016.
U.S. Appl. No. 14/601,793 Notice of Allowance dated Oct. 7, 2016.
U.S. Appl. No. 14/601,793 Office Action dated Apr. 13, 2016.
U.S. Appl. No. 14/601,793 Office Action dated mailed Aug. 3, 2016.
U.S. Appl. No. 14/610,299 Notice of Allowance dated Dec. 13, 2021.
U.S. Appl. No. 14/610,299 Notice of Allowance dated Feb. 20, 2020.
U.S. Appl. No. 14/610,299 Notice of Allowance dated Nov. 16, 2021.
U.S. Appl. No. 14/610,299 Office Action dated Feb. 17, 2021.
U.S. Appl. No. 14/610,299 Office Action dated May 2, 2017.
U.S. Appl. No. 14/610,299 Office Action dated Sep. 25, 2018.
U.S. Appl. No. 15/221,088 Office Action dated Apr. 20, 2018.
U.S. Appl. No. 15/221,088 Office Action dated Dec. 23, 2016.
U.S. Appl. No. 15/221,088 Office Action dated Dec. 4, 2019.
U.S. Appl. No. 15/221,088 Office Action dated Mar. 7, 2019.
U.S. Appl. No. 15/221,088 Office Action dated Sep. 19, 2017.
U.S. Appl. No. 15/229,608 Office Action dated Apr. 4, 2022.
U.S. Appl. No. 15/229,608 Office Action dated Apr. 8, 2019.
U.S. Appl. No. 15/229,608 Office Action dated Feb. 1, 2021.
U.S. Appl. No. 15/229,608 Office Action dated Jun. 29, 2023.
U.S. Appl. No. 15/229,608 Office Action dated May 15, 2020.
U.S. Appl. No. 15/229,608 Office Action dated Nov. 28, 2022.
U.S. Appl. No. 15/229,608 Office Action dated Oct. 25, 2019.
U.S. Appl. No. 15/241,771 Office Action dated Dec. 16, 2022.
U.S. Appl. No. 15/241,771 Office Action dated Dec. 30, 2021.
U.S. Appl. No. 15/241,771 Office Action dated Jan. 18, 2023.
U.S. Appl. No. 15/241,771 Office Action dated Jul. 18, 2022.
U.S. Appl. No. 15/241,771 Office Action dated Jul. 6, 2018.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jun. 18, 2021.
U.S. Appl. No. 15/259,884 Office Action dated Mar. 4, 2022.
U.S. Appl. No. 15/259,884 Office Action dated May 31, 2019.
U.S. Appl. No. 15/259,884 Office Action dated Oct. 11, 2018.
U.S. Appl. No. 15/262,539 Notice of Allowance dated Jun. 18, 2020.
U.S. Appl. No. 15/262,539 Office Action dated Jun. 1, 2018.
U.S. Appl. No. 15/262,539 Office Action dated Jan. 4, 2019.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jul. 31, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,346 Office Action dated Jul. 16, 2021.
U.S. Appl. No. 15/548,346 Office Action dated Jun. 5, 2023.
U.S. Appl. No. 15/548,346 Office Action dated Mar. 18, 2022.
U.S. Appl. No. 15/548,346 Office Action dated May 4, 2020.
U.S. Appl. No. 15/548,346 Office Action dated Oct. 22, 2019.
U.S. Appl. No. 15/548,346 Office Action dated Oct. 3, 2022.
U.S. Appl. No. 15/548,348 Notice of Allowance dated Dec. 12, 2019.
U.S. Appl. No. 15/548,352 Office Action dated Apr. 7, 2022.
U.S. Appl. No. 15/548,352 Office Action dated Aug. 11, 2020.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 15/548,352 Office Action dated Sep. 21, 2021.
U.S. Appl. No. 16/097,035 Notice of Allowance dated Jul. 7, 2022.
U.S. Appl. No. 16/097,035 Notice of Allowance dated Mar. 24, 2022.
U.S. Appl. No. 16/097,035 Office Action dated May 10, 2021.
U.S. Appl. No. 16/097,035 Office Action dated Oct. 30, 2020.
U.S. Appl. No. 16/097,039 Notice of Allowance dated Jun. 14, 2021.
U.S. Appl. No. 16/097,039 Office Action dated Nov. 18, 2020.
U.S. Appl. No. 16/159,144 Office Action dated Mar. 26, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Office Action dated Dec. 15, 2020.
U.S. Appl. No. 16/445,727 Notice of Allowance dated Feb. 2, 2023.
U.S. Appl. No. 16/445,727 Notice of Allowance dated Oct. 26, 2022.
U.S. Appl. No. 16/445,727 Office Action dated Apr. 15, 2022.
U.S. Appl. No. 16/445,727 Office Action dated Aug. 17, 2021.
U.S. Appl. No. 16/563,008 Office Action dated Jul. 25, 2022.
U.S. Appl. No. 16/563,008 Office Action dated Mar. 16, 2023.
U.S. Appl. No. 16/657,386 Notice of Allowance dated Mar. 10, 2023.
U.S. Appl. No. 16/657,386 Office Action dated Nov. 12, 2021.
U.S. Appl. No. 16/657,386 Office Action dated Sep. 16, 2022.
U.S. Serial No. 16/802, 174 Office Action dated Aug. 31, 2022.
U.S. Serial No. 16/802, 174 Office Action dated Feb. 16, 2022.
U.S. Serial No. 16/802, 190 Office Action dated Apr. 19, 2023.
U.S. Serial No. 16/802, 190 Office Action dated Oct. 5, 2022.
U.S. Appl. No. 16/802,212 Office Action dated Sep. 16, 2022.
U.S. Appl. No. 16/855,276 Notice of Allowance dated May 11, 2022.
U.S. Appl. No. 16/855,276 Office Action dated Apr. 5, 2021.
U.S. Appl. No. 16/855,276 Office Action dated Oct. 25, 2021.
U.S. Appl. No. 16/892,199 Notice of Allowance dated Jan. 23, 2023.
U.S. Appl. No. 16/892,199 Notice of Allowance dated Jan. 31, 2023.
U.S. Appl. No. 16/892,199 Office Action dated Jun. 27, 2022.
U.S. Appl. No. 17/062,075 Office Action dated Jun. 14, 2023.
U.S. Appl. No. 17/498,693 Office Action dated Apr. 3, 2023.
U.S. Appl. No. 17/817,482 Office Action dated Mar. 29, 2023.
U.S. Appl. No. 18/046,723 Notice of Allowance dated Apr. 12, 2023.
U.S. Appl. No. 16/802,190 Office Action dated Jan. 31, 2022.
Verfondern, Nuclear Energy for Hydrogen Production. Schriften des Forschungzentrum Julich 58 (2007): 4 pages.
What is Carbon Black, Orion Engineered Carbons, (Year: 2015).
Wikipedia, Heating Element. Oct. 14, 2016. p. 1 para[0001]. Retrieved from https://en.wikipedia.org/w/index.php?title=Heating_element &oldid=744277540 on May 9, 2018.
Wikipedia, Joule Heating. Jan. 15, 2017. p. 1 para[0002]. Retrieved from https://en.wikipedia.org/w/index . Dhp?title=Joule_heating &oldid=760136650 on May 9, 2018.
ASTM International Designation: D6556-14. Standard Test Method for Carbon Black—Total and External Surface Area by Nitrogen Adsorption1, 2014. 5 Pages.
Chuang, S.H. et al. Hot flow analysis of swirling sudden-expansion dump combustor. Int. J. Numer. Meth. Fluids, 14: 217-239 (1992). https://doi.org/10.1002/fld.1650140208.
Co-pending U.S. Appl. No. 18/233,129, inventors Alexander; F. Hoermann et al., filed Aug. 11, 2023.
Co-pending U.S. Appl. No. 18/381,881, inventors Hardman; Ned J. et al., filed Oct. 19, 2023.
Co-pending U.S. Appl. No. 18/384,704, inventors Johnson; Peter L. et al., filed Oct. 27, 2023.
Co-pending U.S. Appl. No. 18/433,023, inventors Johnson; Peter L. et al., filed Feb. 5, 2024.
Co-pending U.S. Appl. No. 18/581,888, inventor Johnson; Peter Louis, filed Feb. 20, 2024.
Co-pending U.S. Appl. No. 16/807,550, filed Mar. 3, 2020.
Definition of disk, Merriam Webster Dictionary, Downloaded on Jun. 7, 2024 from https://www.merriam-webster.com/dictionary/disk, 2 pages.
Definition of platelet, Merriam Webster Dictionary, Downloaded on Jun. 7, 2024 from https://www.merriam-webster.com/dictionary/platelet, 1 page.
Dick, J.S. Utilizing the RPA Variable Temperature Analysis for More Effective Tire Quality Assurance., conference paper/proceeding, International Tire Exhibition & Conference (ITEC), Akron, Ohio, Sep. 16-18, 2008: pp. 1-22.
EP15743214.7 Extended European Search Report dated Jan. 16, 2018.

(56) References Cited

OTHER PUBLICATIONS

EP15743214.7 Partial Supplementary European Search Report dated Sep. 12, 2017.
Erman, et al., The Science and Technology of Rubber. Fourth Edition, Academic Press (2013).
Hiemenz, P.C. Principles of Colloid and Surface Chemistry, 3rd ed., rev. and expanded, pp. 70-78 (1997).
Lahaye, J. et al., Morphology and Internal Structure of Soot and Carbon Blacks. In: Siegla, D.C., Smith, G.W. (eds) Particulate Carbon. Springer, Boston. (1981): 33-34.
PCT/US2015/13487 International Search Report and Written Opinion dated Jun. 16, 2015.
PCT/US2015/13510 International Search Report and Written Opinion dated Apr. 22, 2015.
PCT/US2018/021627 International Search Report and Written Opinion dated May 31, 2018.
PCT/US2018/028619 International Search Report and Written Opinion dated Aug. 9, 2018.
PCT/US2018/048374 International Search Report and Written Opinion dated Nov. 21, 2018.
PCT/US2023/024148 International Search Report and Written Opinion dated Sep. 27, 2023.
PCT/US2023/077402 International Search Report and Written Opinion dated Apr. 7, 2024.
PCT/US2023/077479 International Search Report and Written Opinion dated Apr. 15, 2024.
Schmidt, H. 129Xe NMR spectroscopic studies on carbon and black graphite. Faculty of Natural Sciences of the University of Duisburg-Essen, (2003): 36 pages (German language document and machine translation in English).
Toth, P., et al., Structure of carbon black continuously produced from biomass pyrolysis oil. Green Chem. (2018) vol. 20: 3981-3992.
U.S. Appl. No. 15/229,608 Office Action dated Jan. 23, 2024.
U.S. Appl. No. 15/548,346 Notice of Allowance dated Jan. 18, 2024.
U.S. Appl. No. 15/548,346 Notice of Allowance dated Jan. 30, 2024.
U.S. Appl. No. 16/802,174 Office Action dated Feb. 12, 2024.
U.S. Appl. No. 17/498,693 Office Action dated Jan. 9, 2024.
U.S. Appl. No. 17/669,183 Office Action dated Jan. 5, 2024.
U.S. Appl. No. 17/817,482 Office Action dated Dec. 7, 2023.
U.S. Appl. No. 14/591,528 Office Action dated Apr. 5, 2017.
U.S. Appl. No. 14/610,299 Notice of Allowance dated Mar. 1, 2022.
U.S. Appl. No. 14/610,299 Office Action dated Feb. 1, 2017.
U.S. Appl. No. 14/610,299 Office Action dated Jun. 9, 2020.
U.S. Appl. No. 14/610,299 Office Action dated Jun. 17, 2019.
U.S. Appl. No. 15/229,608 Office Action dated Jul. 30, 2018.
U.S. Appl. No. 15/241,771 Notice of Allowance dated Nov. 20, 2023.
U.S. Appl. No. 15/241,771 Office Action dated Nov. 15, 2017.
U.S. Appl. No. 15/241,771 Office Action dated Sep. 1, 2023.
U.S. Appl. No. 15/259,884 Office Action dated Jan. 9, 2018.
U.S. Appl. No. 15/262,539 Notice of Allowance dated Jul. 23, 2020.
U.S. Appl. No. 15/548,346 Office Action dated Mar. 14, 2019.
U.S. Appl. No. 16/180,635 Notice of Allowance dated Nov. 18, 2021.
U.S. Appl. No. 16/563,008 Notice of Allowance Dated Nov. 6, 2023.
U.S. Appl. No. 16/563,008 Office Action dated Dec. 13, 2021.
U.S. Appl. No. 16/802,174 Office Action dated Oct. 4, 2023.
U.S. Appl. No. 16/802,190 Notice of Allowance dated Feb. 26, 2024.
U.S. Appl. No. 16/802,190 Notice of Allowance dated Mar. 12, 2024.
U.S. Appl. No. 16/802,190 Office Action dated Nov. 17, 2023.
U.S. Appl. No. 16/802,212 Office Action dated Jul. 17, 2023.
U.S. Appl. No. 16/802,212 Office Action dated Mar. 24, 2022.
U.S. Appl. No. 16/802,212 Office Action dated Mar. 25, 2024.
U.S. Appl. No. 16/892,199 Notice of Allowance dated May 4, 2023.
U.S. Appl. No. 17/565,864 Notice of Allowance dated Feb. 1, 2024.
U.S. Appl. No. 17/565,864 Office Action dated Aug. 15, 2023.
U.S. Appl. No. 17/669,183 Office Action dated Aug. 23, 2023.
U.S. Appl. No. 17/669,183 Office Action dated Mar. 15, 2023.
U.S. Appl. No. 17/819,075 Office Action dated Apr. 9, 2024.
U.S. Appl. No. 17/819,075 Office Action dated Oct. 5, 2023.
U.S. Appl. No. 17/938,304 Office Action dated May 21, 2024.
U.S. Appl. No. 17/938,591 Notice of Allowance dated Feb. 9, 2024.
U.S. Appl. No. 17/938,591 Office Action dated Sep. 25, 2023.
U.S. Appl. No. 18/046,723 Notice of Allowance dated Apr. 19, 2023.
U.S. Appl. No. 18/046,723 Notice of Allowance dated Aug. 7, 2023.
U.S. Appl. No. 18/046,723 Notice of Allowance dated Oct. 18, 2023.
Wikipedia. File: Diagram of carbon black structure and texture creation.png. 1-3 (May 8, 2024). https://en.wikipedia.org/wiki/File:Diagram_of_carbon_black_structure_and_texture_creation.png.
Wikipedia. Radiocarbon method. 1-17 (May 8, 2024). https://dewikipedia.org/wiki/Radiokarbonmethode. (German language document and machine translation in English).
Wissler ("Graphite and carbon powders for electrochemical applications", J Power Sources, 156 (2006) 142-150). (Year: 2006).
Zhang, H. et al., Rotating gliding arc assisted methane decomposition in nitrogen for hydrogen production, Intern. J. Hydrogen Energy, 2014, 39, pp. 12620-12635 (Jul. 11, 2014).

* cited by examiner

DC PLASMA TORCH ELECTRICAL POWER DESIGN METHOD AND APPARATUS

CROSS-REFERENCE TO RELATED APPLICATIONS

This application is a continuation of U.S. application Ser. No. 16/892,199, filed Jun. 3, 2020, now issued as U.S. Pat No. 11,665,808, which is a continuation of U.S. application Ser. No. 15/221,088, filed Jul. 27, 2016, which claims priority to U.S. Provisional Application No. 62/198,431, filed Jul. 29, 2015, which applications are incorporated by reference herein in their entirety.

TECHNICAL FIELD

The field of art to which this invention generally pertains is methods and apparatus for making use of electrical energy to effect chemical changes.

BACKGROUND

No matter how unique the product or process is, over time, all manufacturing processes look for ways to become more efficient and more effective. This can take the form of raw material costs, energy costs, or simple improvements in process stability and efficiencies, among other things. In general, raw material costs and energy resources, which are a substantial part of the cost of most if not all manufacturing processes, tend to actually increase over time, because of scale up and increased volumes if for no other reasons. For these, and other reasons, there is a constant search in this area for ways to not only improve the processes and products being produced, but to produce them in more efficient and effective ways as well.

The systems described herein meet the challenges described above while accomplishing additional advances as well.

BRIEF SUMMARY

A method of operating a DC plasma arc torch is described using plasma forming gas and an operating voltage power supply, where the power supply is at least two times the average operating voltage used, resulting in more stable operation of the torch including reduced voltage fluctuations and substantially no extinguishing of the arc.

Additional embodiments include: the method described above where the torch is operated in a power regulating mode where the power supply is operated at a given power setpoint, and the power supply adjusts both the output voltage and the current in order to keep the output power at the setpoint; the method described above where the torch is operated with a current setpoint at which the power supply switches into current regulated mode to keep the arc from extinguishing, and then raises the current setpoint and switches back to power regulated mode once the current is high enough to keep the arc from extinguishing, resulting in substantial elimination of voltage fluctuations and substantial elimination of the arc extinguishing; the method described above where the torch includes concentric cylinder electrodes; the method described above where the power supply has the capability of igniting the torch at a pulse voltage of at least 20 kilovolts; the method described above where the electrodes comprise graphite; the method described above where the plasma forming gas is hydrogen.

An apparatus is also described comprising, a DC plasma torch and an operating voltage power supply, wherein the power supply is at least two times the average operating voltage used, resulting in a more stable operation of the torch.

Additional embodiments include: the apparatus described above where the torch includes concentric cylinder electrodes; the apparatus described above where the power supply has the capability of igniting the torch at a pulse voltage of at least 20 kilovolts; the apparatus described above where the power supply contains inductive filters distributed among positive and negative legs of a regulator to prevent conducted emissions caused by the plasma torch and/or igniter from feeding back into sensitive electronic components; the apparatus described above including filtering elements that causes sensitive electronic components to be exposed to 50% less energy in the form of voltage or current in an instantaneous or cumulative measurement; the apparatus described above where the power supply contains filtering elements at the output of a chopper regulator to shunt high frequency energy; the apparatus described above where the power supply contains chopper regulators in a parallel configuration to achieve redundancy; the apparatus described above where the power supply contains chopper regulators in a series-parallel configuration to allow the use of lower blocking voltages; and the apparatus described above where the electrodes comprise graphite.

These, and additional embodiments, will be apparent from the following descriptions.

DETAILED DESCRIPTION

Figure 1:
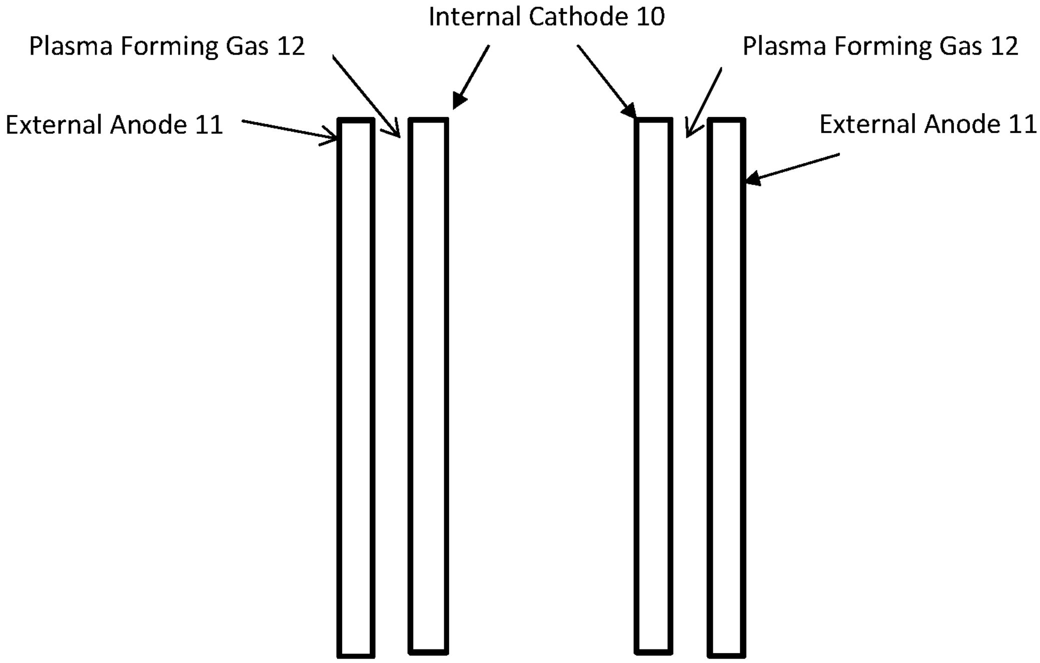
FIG. 1 shows a schematic representation of typical torch as described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Not withstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

A typical DC (direct current) power supply for a DC plasma arc torch will typically be sized such that its maximum voltage is on the order of 35% above the anticipated operating voltage of the torch. With a torch design that employs concentric cylinders as the electrodes (see, for example, U.S. Pat. Nos. 4,289,949 and 5,481,080, the disclosures of which are herein incorporated by reference), the arc behavior can be erratic, for example, exhibited by large fluctuations in voltage to the arc, or even in the extinguishing of the arc. In order to obtain stable operation of such torches, a maximum power supply voltage that is on the order of two times greater than average operating voltage should be used. This will result in the reducing and minimizing the fluctuations in voltage to the arc and substantial elimination of the arc extinguishing.

Additionally, for the same reasons, a higher voltage pulse (e.g., 20 kilovolts (kV)) is required to ignite the torch as opposed to more frequently used lesser voltages (e.g., 6 kV to 12 kV). Due to the higher voltage required, an appropriate capacitive filter is also required to prevent damage to the sensitive electronic components that control the power electronic switching devices. Furthermore, if concentric cylinder graphite rods are used, without a power supply appropriately sized as described herein (e.g., larger than typically used with conventional DC plasma torches) the process would simply not be able to be run stably.

Operating the torch in a power regulating mode also helps to reduce voltage fluctuations. Typically most torches run in current regulated mode, where the power supply is given a current setpoint, and the power supply then adjusts its output voltage in order to keep the current at the setpoint, regardless of the load voltage. Power regulated mode is where the power supply is given a power setpoint, and the power supply then adjust both the output voltage and the current in order to keep the output power at the setpoint.

Running in power regulated mode would substantially reduce the voltage fluctuations, but could lead to the arc extinguishing more often if the current and voltage drifted too far apart and the current gets too low. This can be overcome by operating with a threshold at which the power supply would switch back into current regulated mode in order to keep the arc alive, and then raising the current setpoint and switching back to power regulated mode once the current was high enough. By having a system where the power supply runs in power mode in default, but switches to current mode if the current drops too low, substantial elimination of voltage fluctuations and substantial elimination of the arc extinguishing is accomplished. In other words, not only can set voltage fluctuation standards be met, but the arc can be kept alive at the same time.

Figure 2:
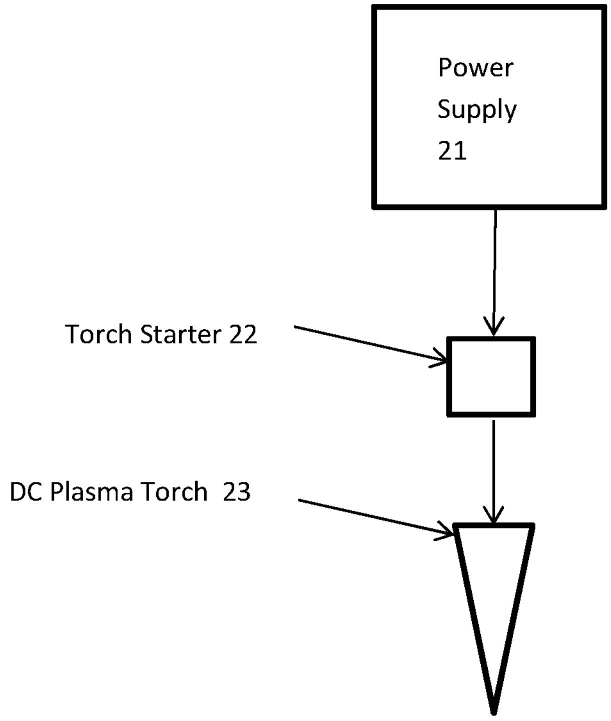
FIG. 2 shows a schematic representation of typical system as described.
Figure 3:
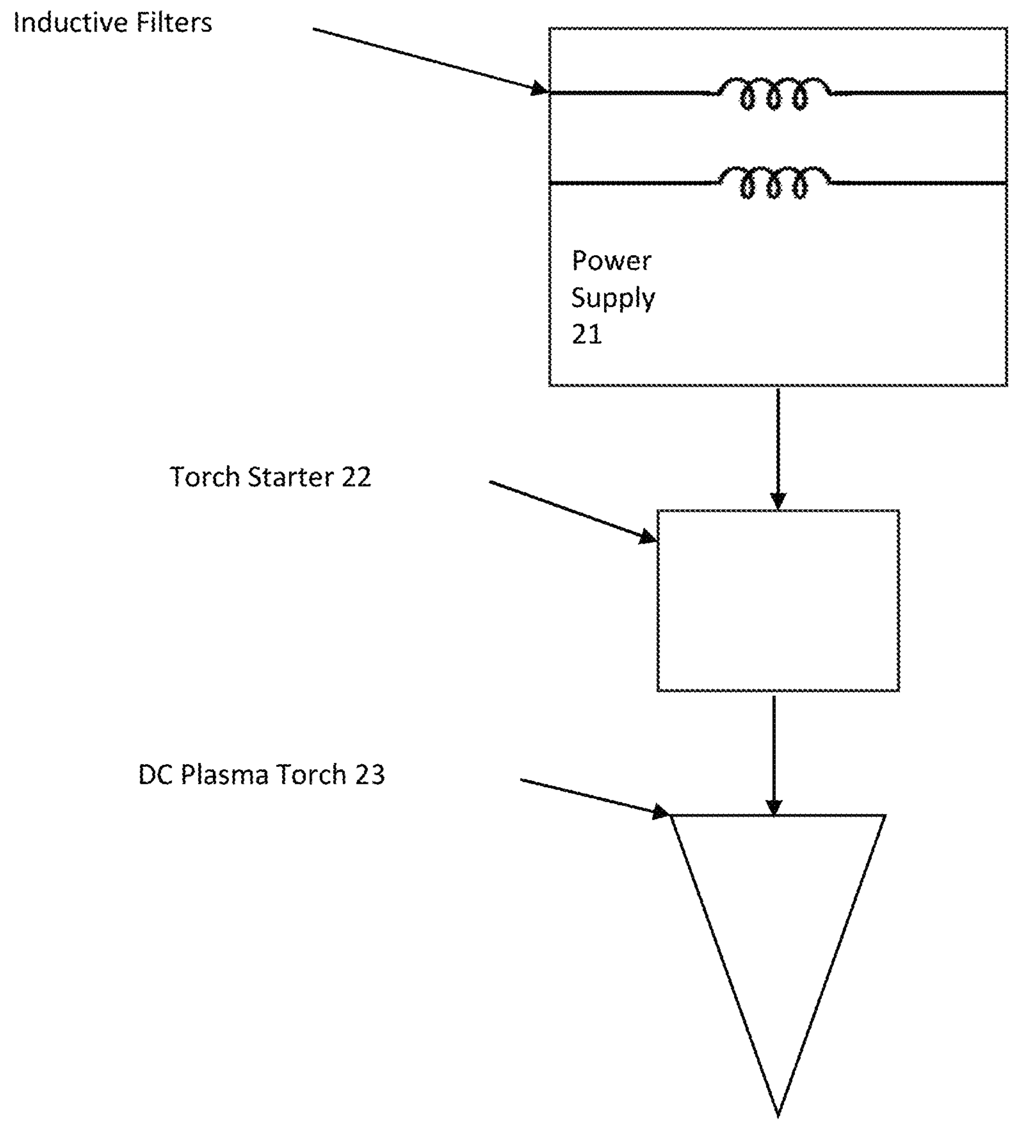
FIG. 3 shows a schematic representation of a typical system as described herein with a power supply containing one or more inductive filters.

A typical torch useful with the present invention is shown schematically in FIG. 1. The concentric cathodes (10) and anodes (11) form the annulus through which conventional plasma forming gas can be supplied (12) between the electrodes (10 and 11). FIG. 2 and FIG. 3 show schematically the power supply (21) connected to a separate torch starter (22) and used to provide power to the DC plasma torch (23).

The power ranges used will vary depending on such things as the size of the reactor, the distance between the electrodes, etc. And while typical operating voltages can be in the 600-1000 volt range, this can also vary depending on such things as electrode gap, gas composition, pressures and/or flow rates used, etc.

Sensitive electronic components are protected through the use of filters as defined herein. Energy is typically shunted through the filter so that the sensitive electronic components are subjected a lower total voltage or current, or rate of change of voltage or current. Appropriate filters include capacitors, LCL (inductive filter), or common mode filter or any other filter of the like.

DEFINITIONS

Plasma Voltage: the instantaneous voltage of the plasma-arc, which varies as a function of the plasma-arc instantaneous impedance and the instantaneous current output of the power supply Operating Voltage: the ultimate output voltage capability of the power supply.

Filter: an arrangement of inductors and/or capacitors that may include resistive components, used to shunt electrical energy away from or block electrical energy from affecting sensitive electronic components.

Sensitive Electronic Components: any device that is integral to the electrical design of the power supply and its various subsystems that is susceptible to excessive voltage, current, and/or heat. This may include power electronic switching devices such as Insulated Gate Bipolar Transistors, Power Metal-Oxide-Semiconductor Field Effect Transistors, Integrated Gate Commutating Thyristors, Gate Turn-Off Thyristors, Silicon Controlled Rectifiers, etc.; the control circuits used to switch or "gate" the power electronic switching devices; transient voltage surge suppression devices; capacitors, inductors, and transformers.

Chopper Regulator: alternate term for a buck regulator, including the traditional topology and all variations, wherein the input DC voltage to the converter is "chopped" using a PWM (pulse width modulation) controlled electronic switch to some lower output voltage.

Snubber Circuit: a protection circuit placed in parallel with a power electronic switching device, the purpose of which is to limit high rates of change of voltage across and/or current through the device.

Smoothing Reactor: refers to either an inductor used as the storage element in a traditional buck/chopper regulator, or an inductor used to limit current ripple at the output of a DC-DC converter.

EXAMPLE 1

A DC concentric cylinder, graphite electrode, plasma torch is operated using an average operating voltage of 300-500 volts. The power supply to operate the plasma torch has a voltage generating capability of at least two times the average operating voltage needed, i.e. 1000 volts. This results in a much more stable operation of the torch as described herein. A separate starter power supply also has the capability of igniting the torch at a pulse voltage of at least 20 kilovolts. The starter power supply contains an appropriate amount of capacitive filtering to shunt unwanted energy away from sensitive electronic components.

EXAMPLE 2

A topology for implementing the system described in Example 1 is as follows. A 6, 12, 18, or 24-pulse rectifier is used as the front end AC-DC converter. This rectifier can be phase-controlled or naturally commutated, with a capacitive output filter, and with or without a commutating output choke. Several chopper regulators composed of power electronic switching devices, snubber circuits, and gating control circuits are used to control the current applied to the load. These chopper regulators can be placed in a parallel configuration to add redundancy, or in a series-parallel configuration to also allow for the use of devices with lower blocking voltages. Smoothing reactors are used as the main energy storage device in the current regulator, and are distributed among the positive and negative legs of the regulator to add additional protection for the sensitive power electronics. Capacitors are used as filters on the output of the current regulator to absorb high frequency energy that may arise from the chaotic nature of the plasma torch load.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for operating a direct current (DC) plasma arc torch, comprising:

operating the DC plasma arc torch using a plasma forming gas and a power supply, wherein the power supply is configured to supply at least two times an average operating voltage used to operate the DC plasma arc torch, resulting in more stable operation of the DC plasma arc torch including reduced voltage fluctuations and substantially no extinguishing of an arc generated by the DC plasma arc torch, and wherein the power supply contains inductive filters distributed among positive and negative legs of a regulator to prevent conducted emissions caused by the DC plasma arc torch from feeding back into sensitive electronic components.

2. The method for operating the DC plasma arc torch of claim 1, wherein the DC plasma arc torch is operated in a power regulating mode where the power supply is operated at a given power setpoint, and wherein the power supply adjusts both the output voltage and the current in order to keep the output power at the given power setpoint.

3. The method for operating the DC plasma arc torch of claim 2, wherein the DC plasma arc torch is operated with a current setpoint at which the power supply switches from the power regulating mode into a current regulated mode to keep the arc generated by the DC plasma arc torch from extinguishing, and wherein the DC plasma arc torch then raises the current setpoint and switches back to the power regulated mode once the current is high enough to keep the arc generated by the DC plasma arc torch from extinguishing, resulting in the reduced voltage fluctuations and the substantially no extinguishing of the arc generated by the DC plasma arc torch.

4. The method for operating the DC plasma arc torch of claim 1, wherein the DC plasma arc torch includes concentric cylinder electrodes.

5. The method for operating the DC plasma arc torch of claim 4, wherein the concentric cylinder electrodes comprise graphite.

6. The method for operating the DC plasma arc torch of claim 1, wherein the power supply has the capability of igniting the DC plasma arc torch at a pulse voltage of at least 20 kilovolts.

7. The method for operating the DC plasma arc torch of claim 1, wherein the plasma forming gas comprises hydrogen.

8. An apparatus for operating a direct current (DC) plasma torch, comprising:

the DC plasma torch, and a power supply, wherein the power supply is configured to supply at least two times an average operating voltage used to operate the DC plasma torch, resulting in a more stable operation of the DC plasma torch, and wherein the power supply includes inductive filters distributed among positive and negative legs of a regulator to prevent conducted emissions caused by the DC plasma torch from feeding back to sensitive electronic components.

9. The apparatus for operating the DC plasma torch of claim 8, wherein the DC plasma torch includes concentric cylinder electrodes.

10. The apparatus for operating the DC plasma torch of claim 9, wherein the concentric cylinder electrodes comprise graphite.

11. The apparatus for operating the DC plasma torch of claim 8, wherein the power supply has the capability of igniting the DC plasma torch at a pulse voltage of at least 20 kilovolts.

12. The apparatus for operating the DC plasma torch of claim 8, wherein the inductive filters cause the sensitive electronic components to be exposed to 50% less energy in the form of voltage or current in an instantaneous or cumulative measurement.

13. The apparatus for operating the DC plasma torch of claim 8, wherein the inductive filters comprise a filtering element located at an output of a regulator to shunt high frequency energy.

14. The apparatus for operating the DC plasma torch of claim 8, wherein the power supply contains chopper regulators in a parallel configuration.

15. The apparatus for operating the DC plasma torch of claim 8, wherein the power supply contains chopper regulators in a series-parallel configuration.

* * * * *